April 17, 1962 J. H. BREMS 3,029,652
INTERMITTENT DRIVE MECHANISM
Filed July 18, 1960 2 Sheets-Sheet 1

INVENTOR.
JOHN H. BREMS
BY
Barnes, Kisselle,
Raisch & Choate
ATTORNEYS

April 17, 1962 J. H. BREMS 3,029,652
INTERMITTENT DRIVE MECHANISM
Filed July 18, 1960 2 Sheets-Sheet 2

INVENTOR.
JOHN H. BREMS
BY
Barnes, Kisselle, Raisch & Choate
ATTORNEYS

United States Patent Office 3,029,652
Patented Apr. 17, 1962

3,029,652
INTERMITTENT DRIVE MECHANISM
John H. Brems, 18478 Westhampton, Southfield, Mich.
Filed July 18, 1960, Ser. No. 43,637
8 Claims. (Cl. 74—89)

This invention relates to material handling devices and more particularly to an intermittent drive mechanism. It relates more especially to the drive of a reciprocating table which is moved from one point to another in an accurate and controlled motion.

It is another object to provide a drive of this type utilizing rotary driving cams in which the formations of deceleration, holding and acceleration are performed separately from the function of steady velocity driving.

It is a further object to provide an improvement on the invention described and claimed in the patent to John H. Brems, No. 2,852,960, issued September 23, 1958. In this patent, there is disclosed the use of an acceleration and deceleration cam in conjunction with a constant velocity cam.

The present invention contemplates the use of this double cam together with a specially designed acceleration and deceleration cam which is adapted to the adjustment of a stroke of a reciprocating element so that a new cam need not be cut for each particular motion desired. Since the cams are an expensive element of the combination, this is particularly an important contribution.

In addition, it is an object to provide a cam element which permits a variety of strokes in between the particular intervals of cam followers, this being accomplished by overlapping one of the acceleration-deceleration cams with the constant velocity cam.

Another object is the provision of a safety device which prevents the destruction of a cam or the breakage of parts in the event of power failure but which insures in each case the stopping of the reciprocating element.

Other objects and features of the invention relating to details of construction and operation will be apparent in the following description and claims.

Figure 1:
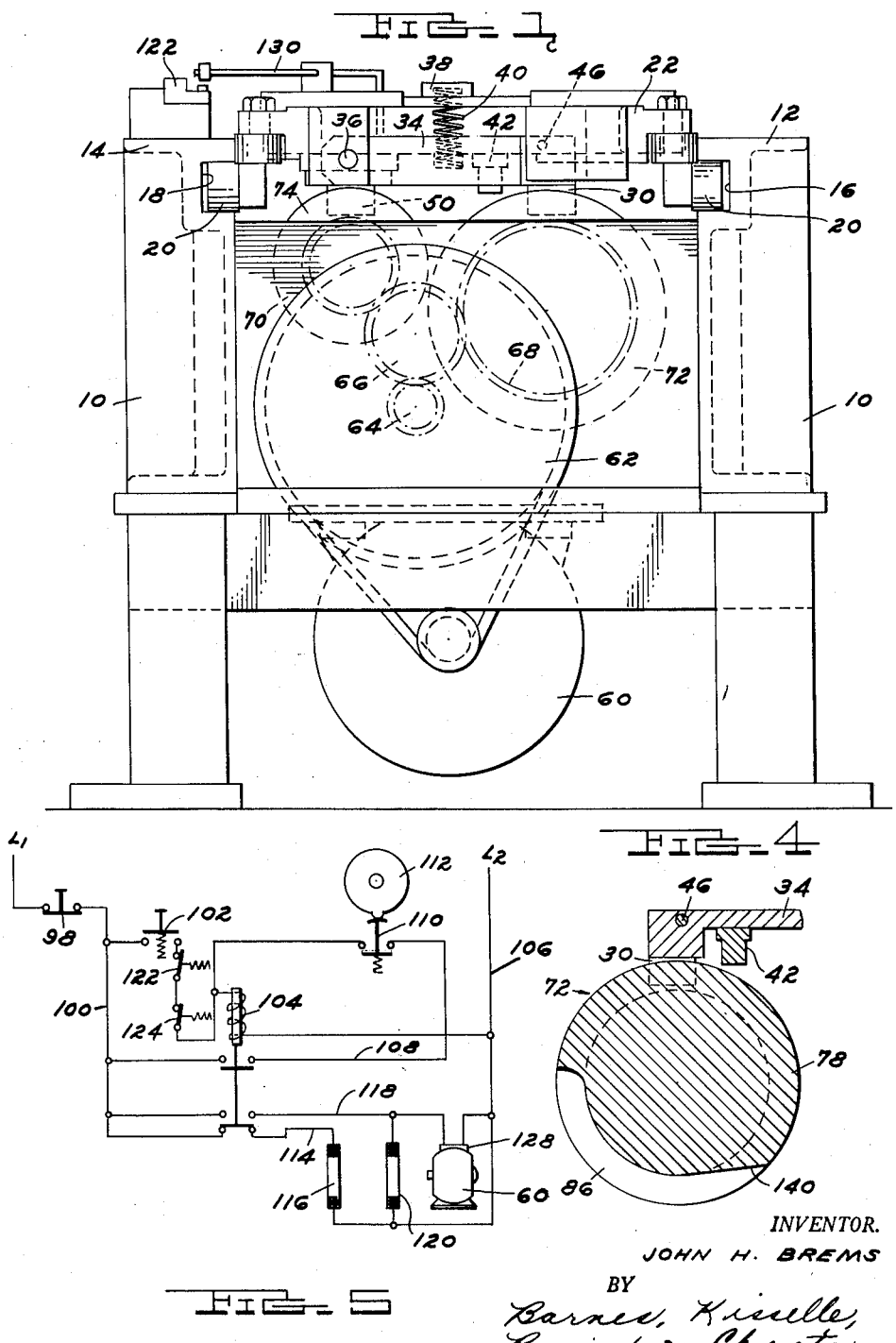

Drawings accompany the disclosure and the various views thereof may be briefly described as follows:

FIGURE 1, an end view of the device showing the relative position of the various parts.

Figure 2:
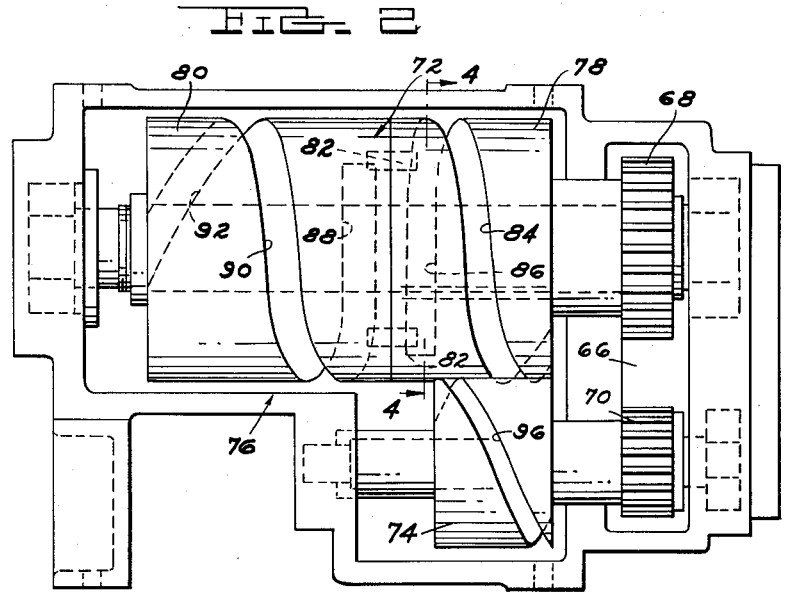

FIGURE 2, a plan view of the cam mechanisms.

Figure 3:
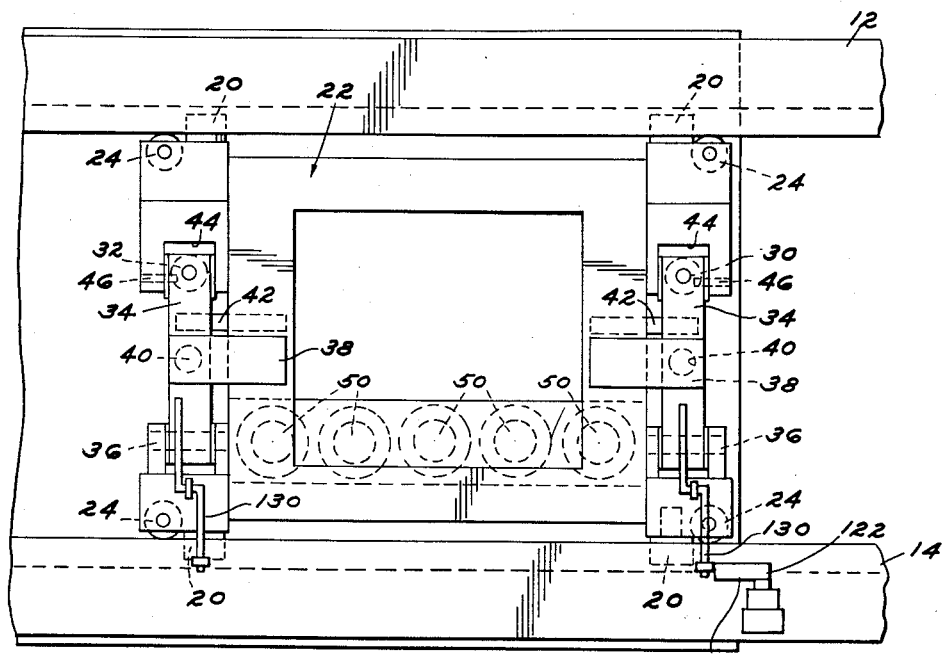

FIGURE 3, a plan view of the reciprocating table.

FIGURE 4, a sectional view on line 4—4 of FIGURE 2.

FIGURE 5, a circuit diagram showing the basic elements of a control circuit.

Essentially, the device comprises a reciprocating drive mechanism consisting of a carriage suitably mounted on a housing and track structure. Below the carriage in the housing is mounted for rotation a group of cams, two of the cams being co-axial and joined for mutual rotation, the third cam being parallel to the first set of cams and mounted to rotate from the same source of power as is used to drive the first cams and also mounted to be accurately cross-geared to the primary cam set.

In the drawings, a basic frame unit, having vertical pillar and frame elements 10, has mounted at the top two horizontally spaced and parallel track members 12 and 14, these track members having internal track grooves 16 and 18 in which ride rollers 20 mounted at the side of a carriage 22. Side rollers 24 mounted on a vertical axis are also provided to provide a smooth operation of the carriage between the tracks 12 and 14. The purpose of the device is to reciprocate the carriage 22 in a predetermined stroke.

This carriage might be used for carrying a workpiece to and from a work station or for carrying an operating tool toward and away from a workpiece. The table has two primary cam followers 30 and 32 in line on the table, each of these cam followers being mounted on an arm 34 pivoted on a pin 36 in the carriage frame. Extending over the arm from the carriage frame is a small plate 38 which has a recess for a spring 40, this spring being also recessed in the top surface of the arms 34. The arms 34 rest on a bar 42 supported also on the carriage frame and the free end of arms 34 are recessed into an opening 44 at the ends of the carriage. A shear pin 46 is provided at the follower end of each arm 34 for a purpose which will be later described.

Also mounted on the bottom of the carriage 22 are secondary cam followers 50, equally spaced along the carriage in intervals, for example, of four inches, on a line parallel to but spaced from the line of primary followers 30—32.

Both of the cam followers 30—32 and all of the cam followers 50 have suitable rollers mounted thereon to operate in the grooves of the cams to be described.

In FIGURE 1, the drive motor 60 is shown mounted in the base of the housing between the pillars 10, this motor being reversible. The motor drives a main pulley 62 and through gears 64 and 66 drives gears 68 and 70 on cam elements 72 and 74. These cam elements are shown in plan in FIGURE 2. These consist of cylindrical elements suitably mounted in a bearing frame 76 within the frame unit. The cam 72 consists of a first-part 78 and a second-part 80, these parts being co-axial and of the same diameter and being pinned together by pins 82 circumferentially spaced so that the two parts rotate together. The primary cam 78 has a cam groove 84 which has a straight dwell section 86 which serves as the stopping and overide section, the remainder of the cam being a gradual increase curve for deceleration and acceleration, this cam cooperating with the cam follower 30. The cam portion 80 is of longer axial dimension than cam 78 and has the same straight dwell section 88 with the acceleration section 90 and a follow-through section 92 of constant velocity.

At the end of each stroke, it will be seen that the follower 30 or 32 will be riding respectively in the cam groove dwell portion 86 or 88, this groove portion being substantially at right angles to the axis of the cams so that the stopping of the motor is not a critical factor in the location of the table at each end of its travel. As the table accelerates, the cam will ride out of the straight portion 86 or 88 and move into the accelerating portion 84 or 90. As the table reaches its top speed, the cam follower 30, for example, will leave the groove 84 and a secondary cam follower 50 will then be entering a constant speed groove 96 in the secondary cam 74. There will be a slight overlap of the grooves in the sense that the follower 30 will be leaving the groove 84 slightly after the first follower 50 enters the groove 96. The cam groove in the secondary cam 74 is a true helix which imparts a constant speed to the table as it moves between the top acceleration point and the beginning of the deceleration point.

The stroke of the table can be regulated with the described mechanism so that the expensive cams can be used for different applications rather than be scrapped if a change is required. The stroke is determined by the spacing of the primary followers and the radial relationship of the two primary cams. For large increments of change, the number of secondary followers is changed and for small increments of change the stroke can usually be changed without a change in the secondary followers because of the elongated constant velocity section 92 of cam 80 which coincides with the cam rate of groove 96 in secondary cam 74. In each case of change, the primary followers must be adjusted to mesh properly with the primary cam grooves.

It will thus be seen that within a certain range the adjustment can be made without adding or subtracting secondary followers and beyond that the number of secondary followers would have to be altered. The relative position of cams 78 and 80 can be determined by relocation of pins 82 as desired.

In FIGURE 5, a simplified control circuit is shown for the device although other circuits may be developed for this same purpose. In FIGURE 5, a main line contactor switch 98 connects the line input terminal L1 with the hot side conductor 100. A cycle initiating contactor 102 of the normally open type connects between conductor 100 and the coil of a holding relay 104, the other side of which is connected to the ground side conductor 106 and ground contact L2. The contactor 102 may be either manually operated or automatically operated in co-ordination with selected stages in the cyclic operation of any associated mechanism.

A holding circuit 108 of the relay 104 includes a normally closed contactor 110 which is actuated by a cam 112 to be opened at the completion of each operating cycle of the complete drive unit. The contactor 110 and the cam 112 are suitably mounted adjacent the motor (not shown).

The relay 104 controls a normally closed brake circuit 114 which includes a brake coil 116 forming part of a combined clutch and brake unit associated with the motor 60. The relay 104 also controls a normally open clutch and motor circuit 118 in which is included both the motor and the clutch coil 120.

Interposed between the start switch 102 and the relay 104 are two limit switches 122 and 124 which would be located at each end of the table travel (see FIGURE 1). These switches are normally closed and if the table tends to overtravel, these switches would be open (see FIGURE 3) by reason of the contact of an arm 130 (actuated by cam arms 34) with an actuator arm 132 on the limit switch 122 or 124.

Provision is made to prevent damage to the parts in the event of power failure. This is accomplished by reason of the pivotal mounting of the arms 34 which carry the primary cam followers 30 and 32. As shown in the sectional view of cam 78 in FIGURE 4, the end of the acceleration-deceleration cam grooves shallow into ramp 140 so that the cam 30 would actually be forced out of the groove. This would shear the shear pin 46 causing the arm 34 to rise against the spring 40. It will be noted, of course, that the carriage will be brought to a stop in the dwell portion of the cam prior to the time that the cam is forced out of the groove. Thus with this arrangement the device cannot be started without the attention of the operator who would have to again align the arm 34 and re-insert a new shear pin.

To follow through the operation of the device, the closing of the switch 98 and the depressing of the starting switch 102 would start the electric motor which as previously described is a reversible motor and which would include in its circuit a suitable reversing switch 128. Assuming that both limit switches 122 and 124 are closed, this will carry energy to the relay 104 which closes the circuits 108 and 118. With switch 110 normally closed, there will be a holding circuit established for the relay 104 and power will pass to the motor 60. Then the first primary cam groove smoothly but positively accelerates the carriage through the primary cam follower 30, for example, and as the follower 30 nears the end of the groove 84, the carriage will have reached its maximum velocity. At this time the first of one or more secondary followers 50 enters the groove 96 of the secondary cam 74 and after a brief period during which both the follower 30 and the follower 50 are engaged, the first primary follower 30 leaves the groove of the primary cam and the carriage is driven at constant velocity by the secondary cam 74 alone.

As the first secondary cam follower 50 approaches the exit of its groove, a second secondary cam follower 50 enters the groove 96 and the process is repeated as many times as necessary to move the carriage through the required stroke up to the point of deceleration. As the last secondary cam follower approaches the exit of its groove, the second primary cam follower 32 enters the groove 92 of cam 80.

As described, there may be considerable overlap on this particular portion of the cam groove 92, but the groove 92 blending into the groove 90 smoothly and positively decelerates the carriage bringing it to a complete stop as the follower 32 enters the dwell or override portion 88. At this time, the timing cam 112 will open the switch 110 to break current to the relay 104 which energizes the circuit 114 to disconnect the clutch 120 and connect the brake 116. On a restart of the circuit by actuation of switch 102, the opposite action will take place.

As previously stated, if the dynamic brake should fail to operate properly, the cam system will stop the carriage. As the cam overtravels the ramp 140, at the end of the dwell 86 or the dwell 88, will force the primary follower 30 or 32 upward out of the groove lifting arm 34 and shearing the retainer pin 46 in the process. This action also kicks the arms 130 down to open switch 122 or 124 depending on what end is involved, so the electric current cannot be restarted until the arm 34 is repositioned. When the difficulty has been corrected, the follower can be repositioned in the cam and the shear pin replaced.

In short, an improper operation of the brake or limit switches which energizes the brake circuit will do no harm other than the breaking of an expendable shear pin. The carriage and its connected rod will come to a complete stop in the proper position. There will be no tendency for the carriage to slam into a stop, overtravel, or start the return stroke.

I claim:

1. In an intermittent driving head for conveyors of the type comprising a primary cam and a secondary cam, each having a generally helical camming surface and having their axes parallel, separate cam followers on a conveyor for each of said cams, means for driving the cams in synchronous rotation, said secondary cam having a camming surface of constant effective pitch and said primary cam having a camming surface of variable pitch along its length, that improvement which comprises a primary cam formed of two cylindrical members coaxially abutted for simultaneous rotation, each of said members having a helical cam track terminating adjacent the joining end of said members in a dwell portion in a plane substantially transverse to the axis of the primary cam and one of said cylindrical members having a helical cam track extended beyond that of the other to overlap engagement of a portion of the helical camming surface of the secondary cam for simultaneous contact with said cam followers.

2. A device as defined in claim 1 in which the cam followers for the primary cam are movably mounted on the conveyor for motion in a direction away from said cam, the dwell portion of each of said primary cam members terminating in a ramp which upon overtravel of said primary cam will move said primary cam followers in said direction, and including means for releasably holding said primary cam followers in said cam tracks of said primary cam members, said holding means being responsive to motion of said primary cam followers in said direction when produced by said ramp to thereby release said primary cam followers from said cam track.

3. A device as defined in claim 2 in which an electrical circuit is provided for actuating the means for driving said cams, and a control switch responsive to motion of said primary cam followers actuated by said ramp to block movement of said cam driving means until said primary cam followers are restored to tracking position.

4. In an index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising a primary cam of the drum type with a generally helical camming surface engageable intermittently with the first series of followers, a secondary cam of the drum type with a generally helical camming surface engageable intermittently with the second series of followers, and means for driving the cams concurrently to drive the conveyor, first from the primary cam alone as the conveyor leaves an indexed position, then from the secondary cam alone and finally from the primary cam alone as the conveyor approaches the next indexed position, that improvement which comprises a primary cam formed of two co-axial cylindrical sections, each having a cam track to cooperate with the cam followers, each cam track having an acceleration-deceleration spiral section blending into a dwell portion in a plane transverse to the axis, said sections being affixed for simultaneous rotation and connected to permit circumferential rotation of said sections relative to one another to adjust the stroke of the conveyor.

5. A device as defined in claim 4 in which the cam followers for the primary cam are movably mounted on the conveyor for motion in a direction away from said cam, the dwell portion of each of said primary cam sections terminating in a ramp which upon overtravel of said primary cam will move said primary cam followers in said direction, and including means for releasably holding primary cam followers in said cam tracks of said primary cam section, said holding means being responsive to motion of said primary cam followers in said direction when produced by said ramp to thereby release said primary cam followers from said cam track.

6. A device as defined in claim 5 in which an electrical circuit is provided for actuating the means for driving said cams, and a control switch responsive to motion of said primary cam followers actuated by said ramp to block movement of said cam driving means until said primary cam followers are restored to tracking position.

7. A device as defined in claim 4 in which one of the sections of the primary cam has a longer axial length than the other and a longer acceleration-deceleration track wherein a primary cam follower may be engaged with said last track while the secondary cam is simultaneously engaged with a secondary follower, said sections being circumferentially relatable in adjusted fixed position to permit varying of the stroke between primary cam followers.

8. In an index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising a primary cam of the drum type with a generally helical camming surface engageable intermittently with the first series of followers, said primary cam having at least one dwell portion in a plane transverse to the axis, a secondary cam of the drum type with a generally helical camming surface engageable intermittently with the second series of followers, and means for driving the cams concurrently to drive the conveyor, first from the primary cam alone as the conveyor leaves an indexed position, then from the secondary cam alone and finally from the primary cam alone as the conveyor approaches the next indexed position, that improvement in which the cam followers for the primary cam are movably mounted on the conveyor for motion in a direction away from said cam, the dwell portion of said primary cam terminating in a ramp which upon overtravel of said primary cam will move said primary cam followers in said direction, and means for releasably holding said primary cam followers in engagement with said camming surface of said primary cam, said holding means being responsive to motion of said primary cam followers produced by said ramp to thereby release said primary cam followers from said engagement with said primary cam.

References Cited in the file of this patent

UNITED STATES PATENTS

| 1,284,733 | Maier | Nov. 12, 1918 |
| 1,331,760 | Harris | Feb. 24, 1920 |
| 2,852,960 | Brems | Sept. 23, 1958 |

FOREIGN PATENTS

| 649,307 | Great Britain | Jan. 24, 1951 |